United States Patent
Zonneveld et al.

(10) Patent No.: US 10,860,405 B1
(45) Date of Patent: Dec. 8, 2020

(54) SYSTEM OPERATIONAL ANALYTICS

(71) Applicant: EMC IP Holding Company LLC, Hopkinton, MA (US)

(72) Inventors: Jeroen Zonneveld, Leiden (NL); Omer Sagi, Mazkeret Batya (IL); Nimrod Milo, Gedera (IL); Amihai Savir, Sansana (IL); Oshry Ben-Harush, Kitbutz Galon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 244 days.

(21) Appl. No.: 14/980,479

(22) Filed: Dec. 28, 2015

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/079* (2013.01); *G06F 11/0709* (2013.01); *G06F 11/0751* (2013.01); *G06F 11/0778* (2013.01); *G06F 11/3006* (2013.01); *G06F 11/3495* (2013.01)

(58) Field of Classification Search
CPC ............... G06F 11/079; G06F 11/0709; G06F 11/0751; G06F 11/0778; G06F 11/3006; G06F 11/3495
See application file for complete search history.

(56) References Cited

U.S. PATENT DOCUMENTS

| | | | |
|---|---|---|---|
| 2009/0245109 A1 | 10/2009 | Hurley et al. | |
| 2012/0096320 A1* | 4/2012 | Caffrey | G06F 11/0709 714/57 |
| 2015/0160098 A1 | 6/2015 | Noda et al. | |
| 2016/0153806 A1* | 6/2016 | Ciasulli | G06F 11/0751 702/184 |
| 2016/0247175 A1 | 8/2016 | Milton et al. | |
| 2017/0046217 A1* | 2/2017 | Shinde | G06F 11/0709 |

OTHER PUBLICATIONS

Bishop, Christopher, "Mixture Models and the EM Algorithm", Microsoft Research, Cambridge, 2006 Advanced Tutorial Lecture Series, CUED.
"Mixture Model", https://en.wikipedia.org/wiki/Mixture_model, downloaded on Sep. 29, 2016.

* cited by examiner

Primary Examiner — Katherine Lin

(57) ABSTRACT

Application data is received from a plurality of monitored applications. The application data is parsed into a plurality of features describing an operation of the plurality of monitored applications. A counter associated with at least one of the plurality of features is incremented. A system health is derived for the plurality of monitored applications from the counter.

20 Claims, 3 Drawing Sheets

SYSTEM OPERATIONAL ANALYTICS

FIELD OF THE INVENTION

This invention relates generally to system management, and more particularly to systems and methods for providing operation analytics related to information technology systems.

BACKGROUND OF THE INVENTION

Information technology systems may generate millions of log entries per second from a large number of subsystems. The log data may provide valuable information on various layers of the system, but may be too voluminous for a system administrator to properly review.

There is a need, therefore, for an improved method, article of manufacture, and apparatus for analyzing operational information technology systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
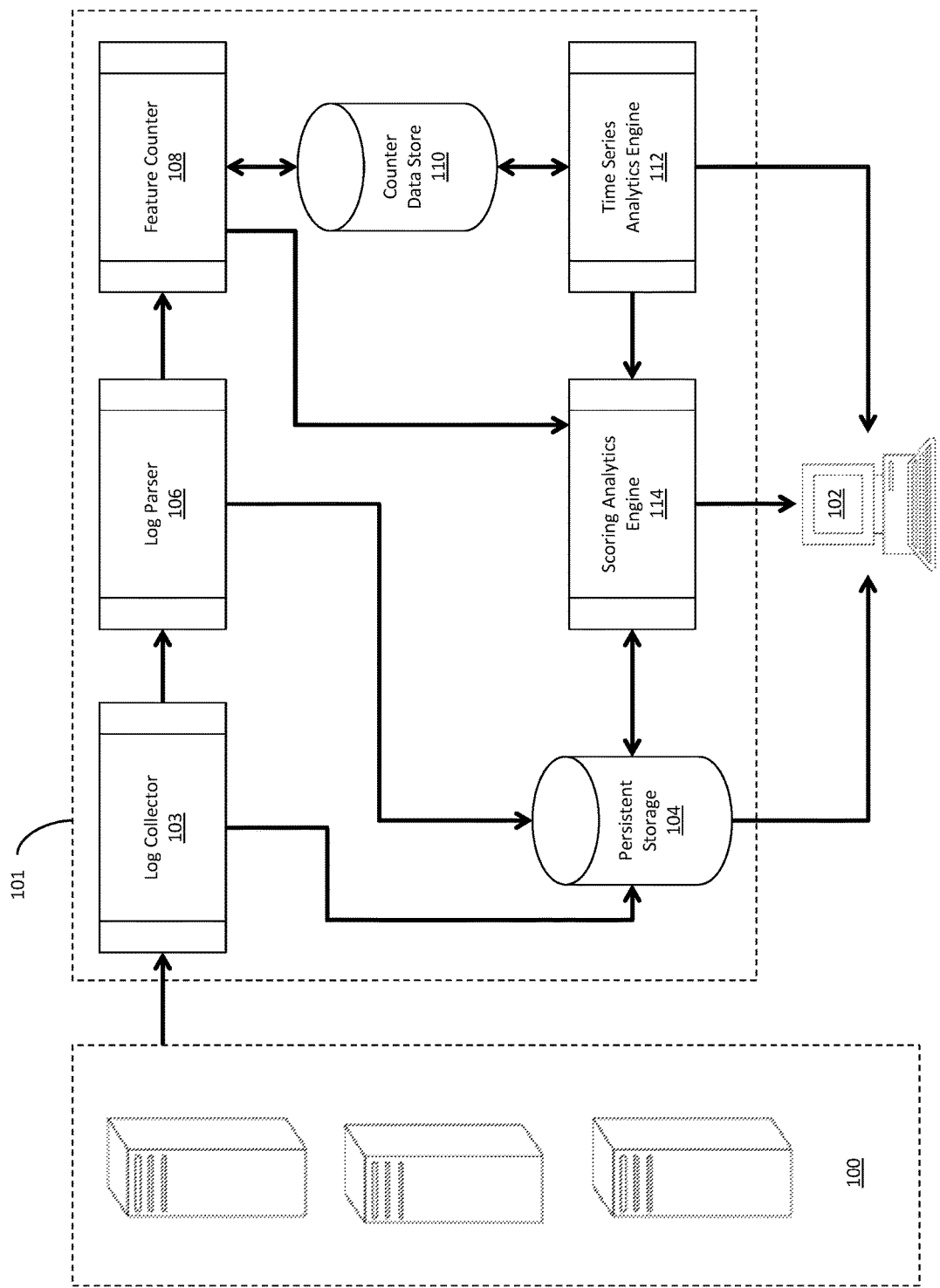
FIG. 1 depicts a system architecture and data flow consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses a system providing operational analytics in an information technology ("IT") system. IT systems may comprise multiple independent applications operating together in real time. If an application fails, it may have a cascading effect on other applications in the system. This could degrade the system's performance as a whole, or even take the system completely offline. Maintaining the system's health, such as the system's performance, availability, responsiveness, etc., therefore includes maintaining the health of individual applications and the integrations between them.

Applications may be monitored in many ways. For example, some applications may include a monitoring tool that generates logs or reports related to the application. Should the application fail, an administrator may review the logs or reports to identify the cause of the failure. Such a monitoring mechanism, however, may be deficient for at least three reasons.

First, a given application may be dependent on the performance of another application in the system. If the other application experiences an issue, the manifestation of the issue may occur in the dependent application rather than the failing application. This may make it difficult to identify the source of the error from the dependent application's log files.

Second, the system may generate an extremely large number of log entries from multiple subsystems and/or applications. Modern systems sometimes generate more than 10,000 events per second, each of which may become one or more log entries. When the system or specific application fails, it may be difficult to identify the cause of the failure as it may be buried deep in the log files.

Third, a failure in the system may not manifest until a period of time after the failure occurred. For example, the failure of a security system may result in unauthorized access to the system. The failure may not manifest, however, until an administrator or user notices information has been accessed. Identifying the cause of the failure may therefore be complicated as days, weeks, or months may have passed since the intrusion occurred. The tools discussed herein alleviate these and other concerns.

The system discussed herein may provide real-time operational analytics of an IT system and its subcomponents. In some embodiments, the system ingests events and/or log entries in real time, thereby providing a system health overview and/or alerts to the system administrator. The system may provide time series predictions from this log information, enabling errors, failures, or anomalies to be identified as they occur. Additionally, the system may comprise a modular framework that can be scaled as the system grows.

In some embodiments, anomalies identified by the system may comprise unexpected behavior, not necessarily bad behavior. For example, the system may be performing unexpectedly well as the result of the anomaly. It may still be beneficial to identify the anomaly so that its cause may be determined and propagated throughout the system.

FIG. 1 depicts both the architecture and data flow for an IT operational analytics system. The system may include a plurality of applications operating on applications servers 100. These applications may be any application found in an IT environment, such as single sign on, backup and recovery, password management, email servers, intranet portals, etc. In some embodiments, the applications may interact with and/or be dependent upon each other. For example, a single sign on application may grant users access to one or more intranet portals. Further, each application may include its own monitoring system and/or generate its own log files. These logs may be stored on the application servers themselves, or they may be stored on a common storage, such as a SAN.

In some embodiments, the applications may stream application data, such as log entries, from application servers 100 to analytics system 101. Analytics system 101 may process the logs in real time to monitor the health of the applications, application servers 100, and/or their integrations. As discussed below, this health information may be presented to an administrator via visualization/alerting system ("VAS") 102, which in some embodiments is a general-purpose computing system.

The application data may be received at log collector 103. In an embodiment, log collector 103 is a computer process configured to receive and or gather raw application data from application servers 100. This raw application data may be formatted by the applications themselves, or may not be formatted at all. For example, raw application data received from one application may be formatted differently than raw application data received from a different application. In some embodiments, log collector 103 may implement a RESTful API. Application servers 100 may transmit application data as it is generated to log collector 103 using HTTP PUT or POST operations. In some embodiments, log collector 103 may include a scheduler or other coordinating process for gathering information from application servers 100. This coordinating process may indicate what information to retrieve from which applications and when. In some embodiments, log collector 103 may comprise a SpringXD module.

Once log collector 103 receives the raw application data, it may be transmitted to at least one of two locations. First, the raw application data may be transmitted to persistent storage 104. Second, the raw application data may be transmitted to log parser 106.

Persistent storage 104 may store the application data in its raw format for future processing and/or retrieval. Storing the raw application data may enable trends not previously known or identified in a time series model to be identified at a later point-in-time. For example, the raw application data may be used for metrics and/or analytics once an anomaly is identified. This raw application data may be accessed from scoring analytics engine 114, time series analytics engine 112, and/or VAS 102.

In some embodiments, persistent storage 104 may include a massively parallel processing ("MPP"), shared-nothing, unstructured database. For example, persistent storage 104 may include multiple independent storage nodes comprising a distributed file system. This file system may be a Hadoop File System ("HDFS"), and persistent storage 104 may be a Hadoop cluster. Additionally or alternatively, the persistent storage may comprise a relational database and/or unstructured data storage such as a SAN.

Log collector 103 may also transmit the raw application data to log parser 106. In some embodiments, log parser 106 is a software process for transforming the raw application data into structured data. This transformation may occur in real time as the data is received from log collector 103. In an embodiment, log parser 106 uses regular expressions to identify specific application features and/or attributes while parsing the data. Examples of these features include log entry types (error, info, debug, etc.), IP addresses, MAC addresses, application IDs, events, client IDs, destination IDs, timestamps, or any other type of discrete data value identifiable in the raw application data. A system administrator may configure the regular expressions, and/or a machine-learning algorithm may generate them as the analytics system 101 processes the information. In an embodiment, log parser 106 may be implemented using SpringXD and may be integrated with or separate from log collector 103.

Once the logs are parsed, the information may be transmitted to at least two locations. First, the parsed logs may be transmitted from log parser 106 to persistent storage 104. Second, the parsed logs may be transmitted from log parser 106 to feature counter 108.

The parsed logs may be transmitted to persistent storage 104, and may be stored next to or apart from the raw application data they were derived from. In some embodiments, features identified by log parser 106 may be associated with their locations in the raw application data on persistent storage 104. This may assist an administrator or process interested in the feature to quickly identify the relevant raw application data.

The parsed logs may also be transmitted to feature counter 108. This transmission may occur before, after, or in parallel with transmitting the parsed logs to persistent storage 104. Feature counter 108 may comprise a software process for tracking features received from log parser 106. Each feature may be associated with a counter, and that counter may be incremented every time a feature is identified. The counters may serve to both normalize and aggregate information from the parsed logs. For example, every time a given IP address is identified from the parsed log files, a counter associated with that IP address may be incremented. In some embodiments the counters are stored using an in-memory data structure, such as counter data store 110. Counter data store 110 may comprise a shared memory space accessible by multiple software modules, including time series analytics engine 112. The in-memory database could be, for example, a Redis data store.

In some instances, feature counter 108 may identify features that occur so rarely that their occurrence is likely critical. When feature counter 108 identifies a critical feature, an alert may be transmitted to scoring analytics engine 114. The alert may immediately lower the system's health score, as discussed below, and be raised at VAS 102. In some embodiments, the counters associated with critical features are never reset and/or may be excluded from the time series analysis discussed below. An example of a critical feature may be a complete system failure of one or more application servers 100.

In an embodiment, the feature counters in counter data store 110 may be accessed from time series analytics engine 112. Time series analytics 112 may analyze, manage, and derive information from the counters, such as by providing baseline models, forecasting, and event probabilities. In some embodiments, time series analytics engine 112 may reset the counters at regular intervals, such as every minute, to provide a time series. The time series and resultant information may then be used to determine an overall system health. For example, the time series may provide a baseline model of system performance, a point-in-time snapshot of the system's health, or be used to create a forecast predicting future performance.

In an embodiment, time series analytics engine 112 may create a baseline time series model identifying ideal, healthy, or expected system performance. For example, the model may determine that under normal operation, application servers 100 never receive more than one access request per minute from a given IP address. This determination may come from observing that a counter associated with the IP address in counter data store 110 rarely exceeds one during any interval. This baseline may be stored in memory or persistent storage, and may be updated over time as system characteristics and usage changes. In some embodiments, this baseline model may be created and/or modified by a system administrator. This may allow the owner of the system to define what they believe to be a healthy system.

The baseline time series model could be created over a period of time and updated continuously. For example, the model may be updated after each interval or set of intervals. In some embodiments, the baseline model is only updated when there were a limited number or no anomalies identified in the previous interval or set of intervals. This allows the baseline to learn and develop over time without being corrupted by anomalous activity. This process may comprise dampening training, and in an embodiment may comprise percentile filtering.

Additionally or alternatively, the time series analytics engine 112 may provide a point-in-time snapshot of the system's health and/or performance. This point-in-time snapshot may be generated from the counters in counter data store 110, and may be based on the current interval or an aggregation of previous intervals. In some embodiments, the point-in-time snapshot may be compared to the generated baseline to identify anomalies. For example, the point-in-time snapshot may identify a particular IP address attempted to access the application servers 100 five-hundred times in the most recent interval. If the baseline identifies an IP address should only be accessing application servers 100 at most once per interval, the extra accesses may be anomalies.

In some embodiments, time series analytics engine 112 may provide system forecasting. Forecasting may enable time series analytics engine 112 to estimate future values of the time series. Forecasts may be helpful for identifying future issues before they occur, or as a baseline for future point-in-time comparisons.

When the forecast identifies potential future issues, remedial actions may be taken before the issue actually manifests. For example, the forecast may identify that writes to a specific storage device are trending upwards, and therefore determine the storage device may soon reach capacity. As a result of the forecast, future writes may be rerouted to a different, less utilized device.

The forecast may also be used to identify future anomalies. For example, the forecast may determine from the time series model and counters that a specific IP address is likely to access a given application server one-to-two times in each of next ten intervals. If time series analytics engine 112 then determines the IP address has accessed an application server a number of times outside of this range, it may be marked as an anomaly.

Forecasts may vary in length depending upon a configuration or other setting. For example, the forecasts may operate in real-time and not extend longer than a few minutes into the future. They may also be short-term, extending several hours into the future. Similarly, forecasts may be mid-term, extending several days into the future. Mid-term forecasts may be beneficial for predicting resource consumption. In some embodiments, forecasts may be long term and cover multiple months and/or years. Long term forecasts may help with strategic decisions, such as investments.

In some embodiments, different models may be used to create the forecasts. For example, the forecast may be created using an autoregressive ("AR") model. AR models relate the value of a variable in one interval to its value in a previous interval. For example, if the number of connections from a specific IP address is one for the current period, the AR model may also determine it will be one for the next period. Similarly, the forecast may be based on a moving average. The moving average model may relate the value of a variable in one interval to a rolling average of the variable in previous intervals. This may be particularly useful in identifying system trends, either up or down. For a stationary process, the forecast may also be generated using an autoregressive moving average (ARMA). Stationary processes have a "stationary" or unchanging mean and variance over time. For processes containing evidence of being non-stationary, the forecast may be generated using an autoregressive integrated moving average (ARIMA). Finally, either a holt-winter and/or a neural network may be used to provide the forecast.

Time series analytics engine 112 may use the forecasts and the current count values to identify anomalies that may otherwise be difficult to detect. For example, residuals (i.e. the difference between the forecasted count and the actual count) may be calculated for one or more features. If the residual is a substantial or unexpected number, it may indicate an anomaly. If the residual is not a substantial number, the system may not identify it as an anomaly. Multiple insubstantial residuals spread across a number of features, however, may actually be indicative of an anomaly. The present system may identify those anomalies, even if they are not readily apparent from a single residual.

A mixture model, such as a Gaussian Mixture Model, may identify anomalies from multiple different residuals. In some embodiments, the residuals for a plurality of features may be determined from each feature's count and the corresponding forecasted value. The mixture model may then be applied to the residuals to identify anomalies that may otherwise be undetectable by the features and/or anomalies themselves.

Once time series analytics engine 112 has identified forecasts, baselines, residuals, anomalies, or any other information, that information may be presented to scoring analytics engine 114 and/or VAS 102. Additionally or alternatively, the information and/or the feature count values may be passed to persistent storage 104 for future analytics and/or time series training. Scoring analytics engine 114 may normalize the data and convert it into a human-readable numeric value. For example, a system's health may fall on a spectrum between 0 and 100. Each anomaly identified, whether it is different than a baseline or inconsistent with a forecast, may impact the score. Problematic anomalies may lower the score and beneficial anomalies may raise the score. In an embodiment, the normalization process may involve combining data received from the time series analytic engine, such as forecasts and residuals, and/or data retrieved from persistent storage 104. Once a score has been normalized from the information received from time series analytics engine 112, it may be presented to visualization/alerting system 102 and/or stored to persistent storage 104 future training and/or analysis.

In some embodiments, scoring analytics engine 114 and time series analytics engine 112 may generate different scores for different components in application servers 100. For example, the components may generate a health score for each individual server, hardware component, and/or application, in addition to an overall health score. These component scores may be helpful in determining which components are the cause of specific issues.

Visualization/alerting system ("VAS") 102 may perform multiple roles. In some embodiments, VAS 102 may be a general-purpose computer accessible by a system administrator. VAS 102 may present the system administrator with the score provided from scoring analytics engine 114. The administrator may be able to quickly determine the health of the system from this score. If the score falls too low, the administrator may take remedial actions. VAS 102 may also enable the administrator to research the cause of score, such as by examining the raw application data and/or parsed logs stored on persistent storage 104. In some embodiments, VAS 102 may receive alerts or other information directly from time series analytics engine 112. Alerts may comprise information derived from the counters that require immediate attention.

In an embodiment where VAS 102 has been provided component health scores for applications, hardware, and other components associated with application servers 100, an administrator may be able to quickly identify root causes of anomalies. For example, if application servers 100 have an unexpectedly low score, the administrator may examine the scores of their constituent components. Upon identifying a component with a lower than expected score, the administrator may review the logs, either raw or parsed, associated with that component to identify potential issues.

Figure 2:
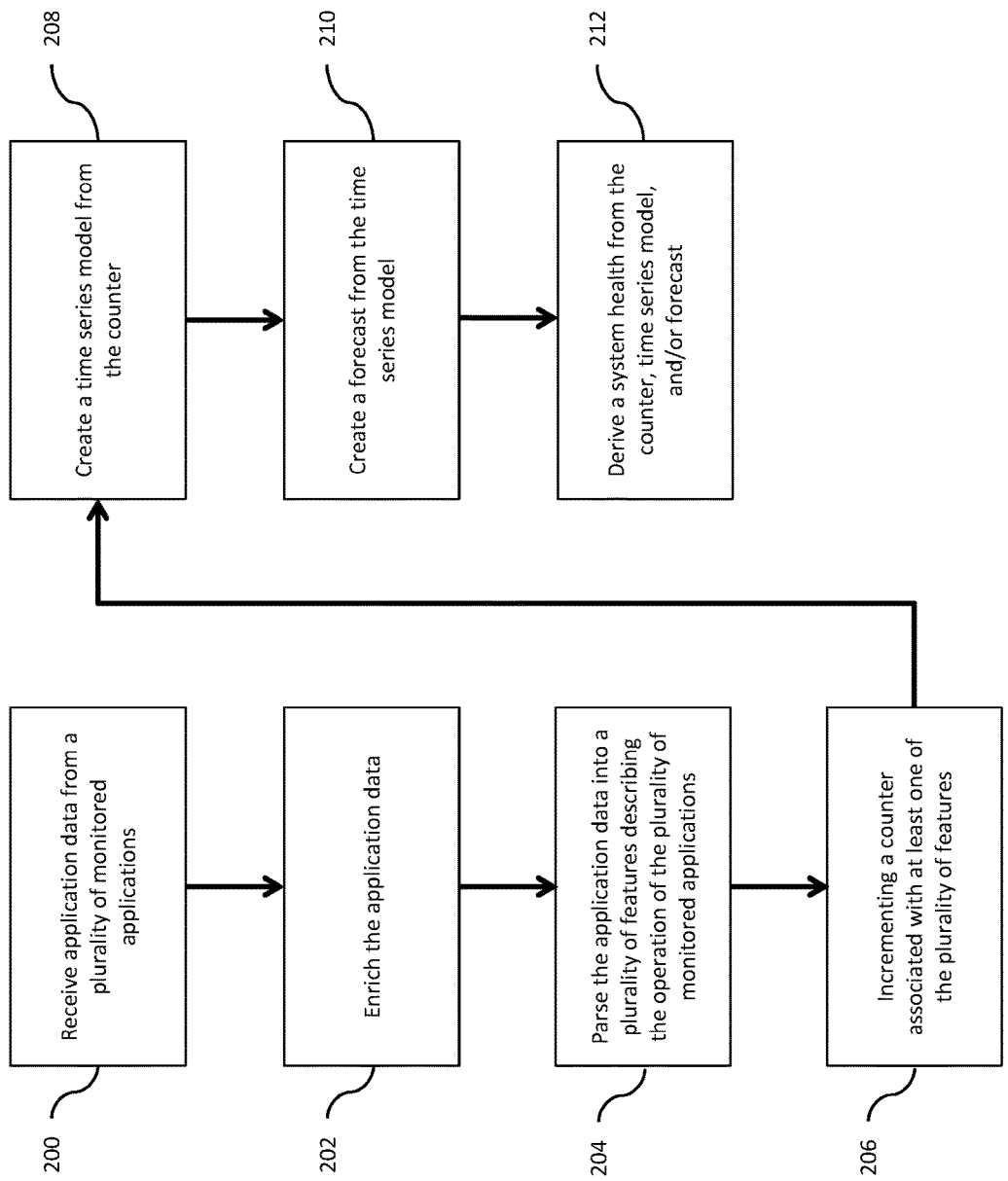
FIG. 2 depicts a flowchart consistent with an embodiment of the present disclosure.

Turning now to FIG. 2, a dataflow and process chart is discussed. This process may operate, for example, on the system depicted in FIG. 1.

At block 200, application data is received from a plurality of monitored applications. These applications could, for example, operate on application servers 100. The application data may be raw application data, and could be received at analytics system 101. In some embodiments, the application data is received at a log collector, such as log collector 103.

At block 202, the received application data may be enriched. Enriching the application data could occur, for example, at a log parser, such as log parser 106. In some embodiments, the data is enriched from information received from other sources. For example, application data received from an active directory server may contain information relevant to an exchange server, such as a user's encrypted password. The active directory application information may therefore be used to enrich the exchange server's data, such as by filling in missing values.

At block 204, the application data may be parsed into a plurality of features describing the operation of the plurality of monitored applications. Parsing the application data may occur, for example, at log parser 106. The application data may be parsed using regular expressions, or any other technology capable of extracting information on from text strings.

At 206, a counter associated with at least one of the features may by incremented. In some embodiment, each feature may have its own counter and each counter may be incremented for every identified feature. For example, if three different IP addresses are parsed from the logs, each IP address may be one feature with an associated counter. Each of these three counters may be incremented. If one IP address was parsed from the application data twice, that IP address' counter may be incremented twice. These counters may be stored in a counter store, such as counter store 110.

At block 208, a time series model may be trained from the counters. The time series model may be created using a time series analytics engine, such as time series analytics engine 112.

At block 210, a forecast may be created using the time series model. The forecast may also be created using a time series analytics engine, and in an embodiment may forecast predicted system performance.

Finally, at block 212, a system health may be derived from the time series model and/or forecast. This system health may be a normalized score, as discussed above, and in an embodiment may enable an administrator to identify anomalies in the system. This normalization may involve combining different forecasts, counts, residuals, anomalies, and/or other data into a single score. In some embodiments, the system health may be determined by a scoring analytics engine, such as scoring analytics engine 114.

Figure 3:
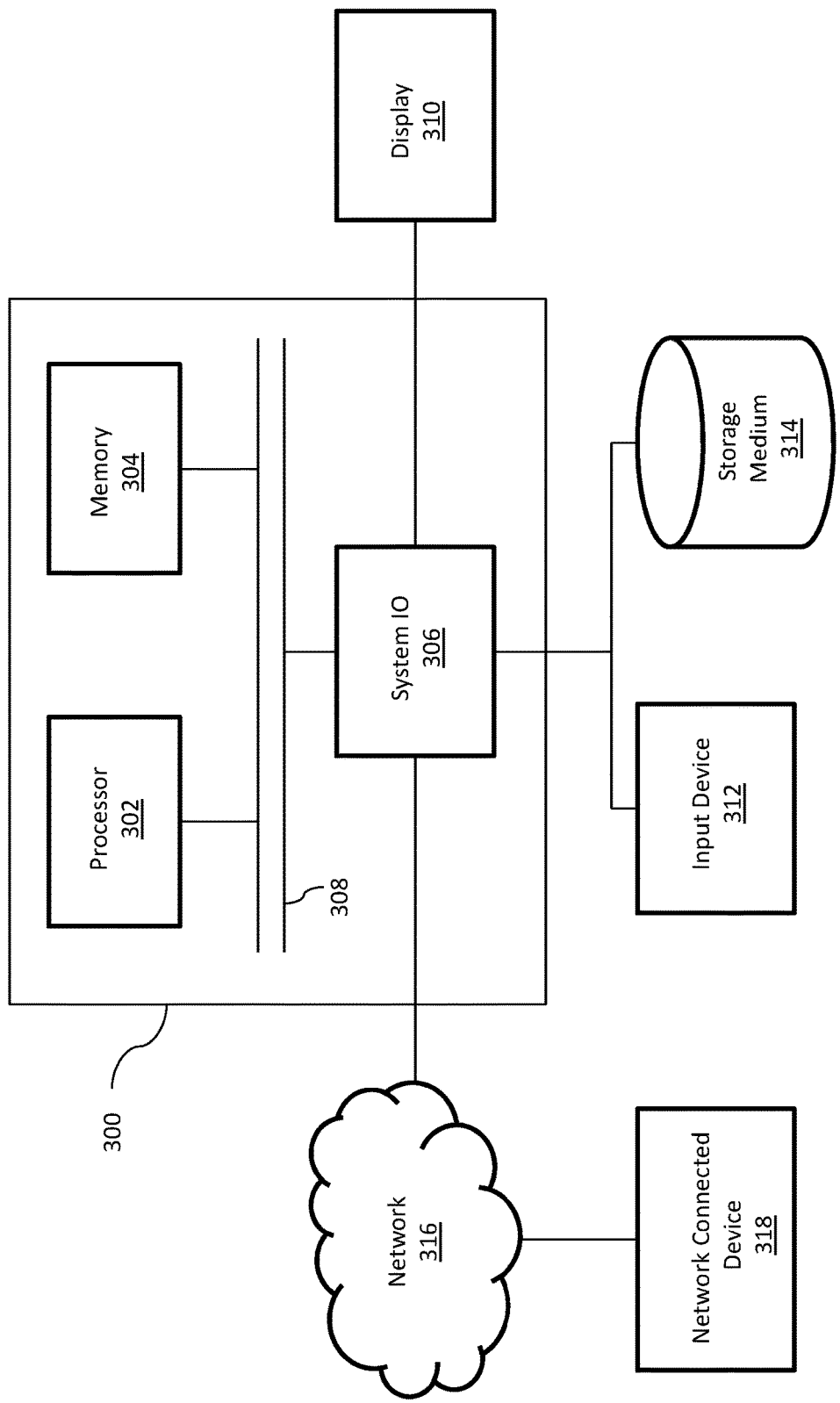
FIG. 3 depicts a general-purpose computer system consistent with an embodiment of the present disclosure.

FIG. 3 depicts a computer system which may be used to implement different embodiments discussed herein. General purpose computer 300 may include processor 302, memory 304, and system IO controller 306, all of which may be in communication over system bus 308. In an embodiment, processor 302 may be a central processing unit ("CPU") or accelerated processing unit ("APU"). Some embodiments may comprise multiple processors, or a processor with multiple cores. Processor 302 and memory 304 may together execute a computer process, such as the processes described herein.

System IO controller 306 may be in communication with display 310, input device 312, non-transitory computer readable storage medium 314, and/or network 316. Display 310 may be any computer display, such as a monitor, a smart phone screen, or wearable electronics and/or it may be an input device such as a touch screen. Input device 312 may be a keyboard, mouse, track-pad, camera, microphone, or the like, and storage medium 314 may comprise a hard drive, flash drive, solid state drive, magnetic tape, magnetic disk, optical disk, or any other computer readable and/or writable medium. Storage device 314 may also reside inside general purpose computer 300, rather than outside as shown in FIG. 1.

Network 316 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 316 may be either wired or wireless or any combination thereof, and may provide input to or receive output from IO controller 306. In an embodiment, network 316 may be in communication with one or more network connected devices 318, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for providing operational analytics for an information technology system, the method comprising:
    receiving application data from a plurality of application servers for a plurality of monitored applications;
    parsing the application data into a plurality of features describing an operation of the plurality of monitored applications;
    incrementing a counter associated with at least one of the plurality of features to normalize information from the parsed application data;
    creating a time series model from the counter;
    calculating, using at least one processing device, one or more residuals for the at least one feature based on a difference between a count forecasted based on the time series model and an actual count;
    applying, using said at least one processing device, one or more statistical distribution Mixture Models to the one or more residuals to detect at least one anomaly corresponding to at least one of the application servers;
    deriving, using said at least one processing device, a normalized system health score for the plurality of monitored applications from the detected anomalies; and
    in response to detecting the at least one anomaly, adjusting a configuration corresponding to the at least one of the application servers to mitigate said at least one anomaly.

2. The method of claim 1, further comprising enriching the application data prior to parsing the application data.

3. The method of claim 1, further comprising training the time series model from the counter.

4. The method of claim 3, further comprising creating a forecast from the time series model, wherein the forecast identifies an expected behavior for the plurality of monitored applications.

5. The method of claim 4, wherein deriving the normalized system health score comprises comparing the forecast and the counter to identify a deviation.

6. A computer program product for providing operational analytics for an information technology system, the computer program product comprising a non-transitory computer readable medium encoded with computer executable program code, the computer executable program code when executed by at least one processing device perform the following steps:
    receiving application data from a plurality of application servers for a plurality of monitored applications;
    parsing the application data into a plurality of features describing an operation of the plurality of monitored applications;
    incrementing a counter associated with at least one of the plurality of features to normalize information from the parsed application data;
    creating a time series model from the counter;
    calculating, using at least one processing device, one or more residuals for the at least one feature based on a difference between a count forecasted based on the time series model and an actual count;
    applying, using said at least one processing device, one or more statistical distribution Mixture Models to the one or more residuals to detect at least one anomaly corresponding to at least one of the application servers;
    deriving, using said at least one processing device, a normalized system health score for the plurality of monitored applications from the detected anomalies; and
    in response to detecting the at least one anomaly, adjusting a configuration corresponding to the at least one of the application servers to mitigate said at least one anomaly.

7. The computer program product of claim 6, further comprising enriching the application data prior to parsing the application data.

8. The computer program product of claim 6, further comprising training the time series model from the counter.

9. The computer program product of claim 8, further comprising creating a forecast for the time series model, wherein the forecast identifies an expected behavior for the plurality of monitored applications.

10. The computer program product of claim 9, wherein deriving the normalized system health score comprises comparing the forecast and the counter to identify a deviation.

11. A system for providing operational analytics for an information technology system, the system comprising a computer processor configured to execute the following instructions comprising:
    receiving application data from a plurality of application servers for a plurality of monitored applications;
    parsing the application data into a plurality of features describing an operation of the plurality of monitored applications;
    incrementing a counter associated with at least one of the plurality of features to normalize information from the parsed application data;
    creating a time series model from the counter;
    calculating, using at least one processing device, one or more residuals for the at least one feature based on a difference between a count forecasted based on the time series model and an actual count;
    applying, using said at least one processing device, one or more statistical distribution Mixture Models to the one or more residuals to detect at least one anomaly corresponding to at least one of the application servers;
    deriving, using said at least one processing device, a normalized system health score for the plurality of monitored applications from the detected anomalies; and in response to detecting the at least one anomaly, adjusting a configuration corresponding to the at least one of the application servers to mitigate said at least one anomaly.

12. The system of claim 11, further comprising enriching the application data prior to parsing the application data.

13. The system of claim 11, further comprising training the time series model from the counter.

14. The system of claim 13, further comprising creating a forecast for the time series model, wherein the forecast identifies an expected behavior for the plurality of monitored applications.

15. The system of claim 14, wherein deriving the normalized system health score comprises comparing the forecast and the counter to identify a deviation.

16. The method of claim 1, wherein said at least one anomaly corresponds to a capacity of a storage device of the at least one of the application servers, and wherein said adjusting the configuration comprises rerouting future write operations for said storage device to a different storage device.

17. The computer program product of claim 6, wherein said at least one anomaly corresponds to a capacity of a storage device of the at least one of the application servers, and wherein said adjusting the configuration comprises rerouting future write operations for said storage device to a different storage device.

18. The system of claim 11, wherein said at least one anomaly corresponds to a capacity of a storage device of the at least one of the application servers, and wherein said adjusting the configuration comprises rerouting future write operations for said storage device to a different storage device.

19. The method of claim 1, wherein said deriving the normalized system health score for the plurality of monitored applications from the detected anomalies comprises generating health scores for a plurality of components corresponding to each said plurality of application servers.

20. The computer program product of claim 6, wherein said deriving the normalized system health score for the plurality of monitored applications from the detected anomalies comprises generating health scores for a plurality of components corresponding to each said plurality of application servers.

* * * * *